Oct. 29, 1929.  A. JAECKS  1,733,883
COTTON SPRAYING MACHINE
Filed Nov. 15, 1927  2 Sheets-Sheet 1
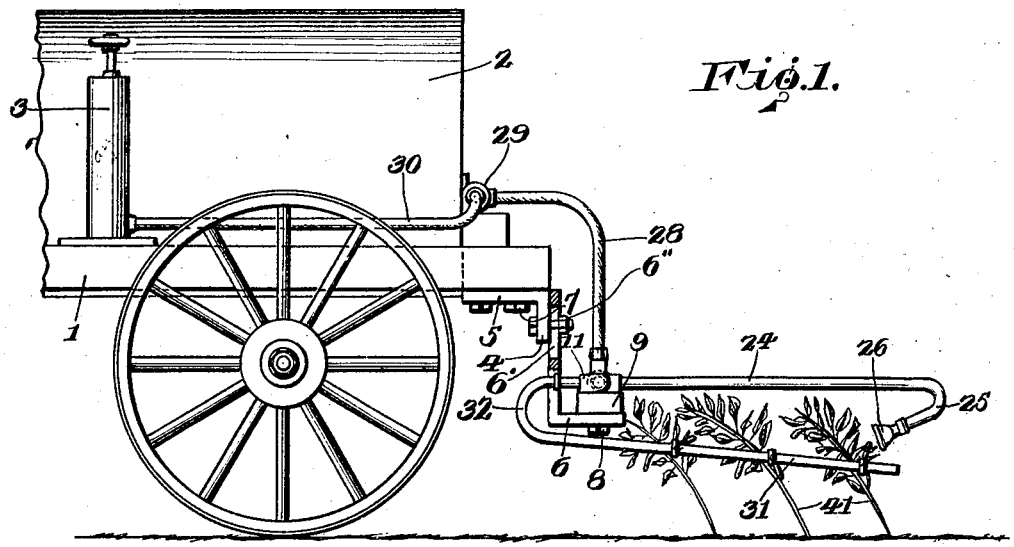
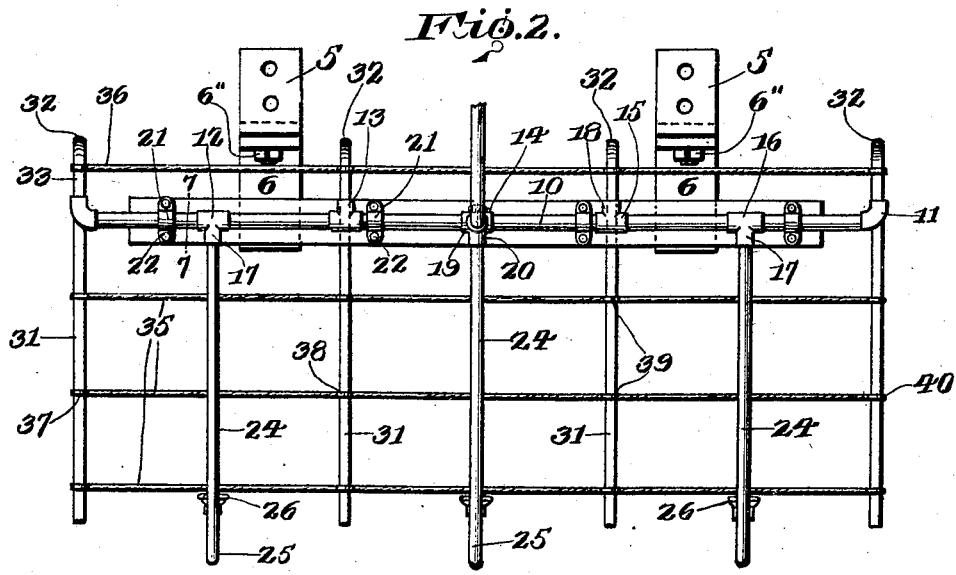
INVENTOR.
Albert Jaecks,
BY
Geo. P. Kimmel
ATTORNEY.

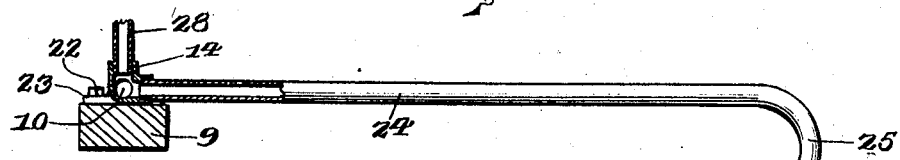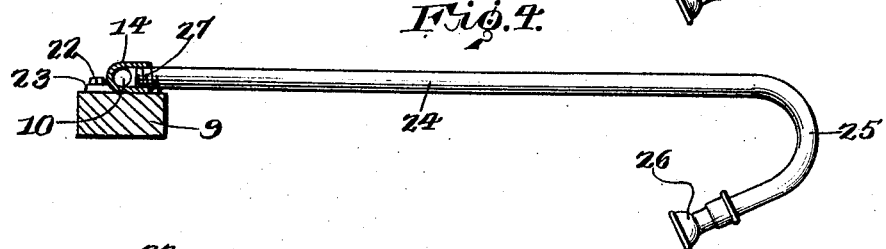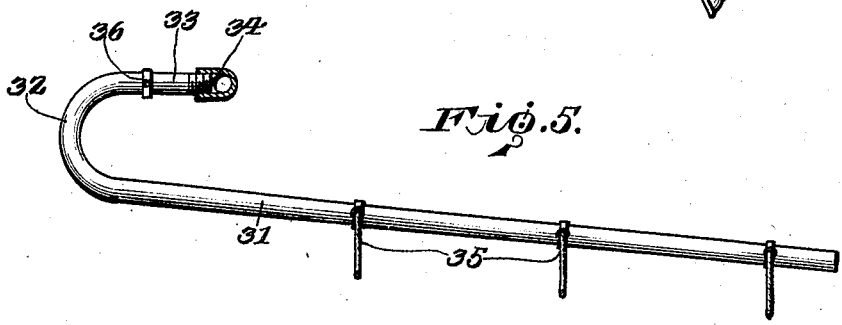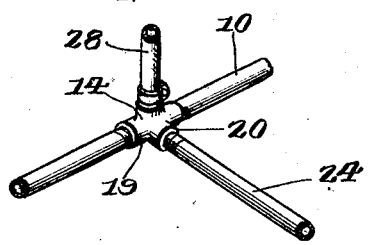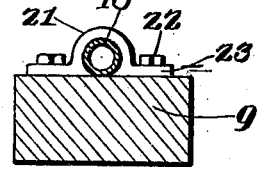

Patented Oct. 29, 1929

1,733,883

UNITED STATES PATENT OFFICE

ALBERT JAECKS, OF SEALE, TEXAS

COTTON-SPRAYING MACHINE

Application filed November 15, 1927. Serial No. 233,492.

This invention relates to a spraying device designed primarily for the spraying of cotton plants, but it is to be understood that a spraying device, in accordance with this invention, may be employed for the spraying of any plants for which it is found applicable, and the invention has for its object to provide, in a manner as hereinafter set forth, a device of the class referred to for spraying the plants from the underside of the foliage and further for spraying all of the plant growth beneath the leaves whereby the plants are sprayed in a satisfactory manner to protect the same.

Further objects of the invention are to provide, in a manner as hereinafter set forth, a spraying device which is comparatively simple in its construction and arrangement, strong, durable, compact, thoroughly efficient in its use, readily assembled, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation of a spraying device in accordance with this invention and showing the connection thereof with respect to a portable solution supply and pump.

Figure 2 is a fragmentary view, in top plan, of a spraying device in accordance with this invention.

Figure 3 is a sectional elevation of one of the spraying elements.

Figure 4 is a side elevation of one of the spraying elements.

Figure 5 is a side elevation of one of the supports for the plant tilting element.

Figure 6 is a view in perspective of fragmentary portion of the device.

Figure 7 is a section on line 7—7 Figure 2.

Referring to the drawings in detail 1 indicates a travelling vehicle provided with a tank 2 carrying the supply of solution which is employed for spraying purposes, 3 indicates the pump which communicates with the device for spraying the solution under pressure. The foregoing elements are of known construction and are illustrated, by way of example, to show the adaptation of a spraying device, in accordance with this invention, with respect to a source of solution and pressure and a portable means for the device.

The spraying device comprises a pair of supports and each of which includes a vertical portion 4 and a forwardly extending portion 5 projecting from the upper end of the portion 4. The portion 5 of each support is fixedly secured to the rear of the body of the vehicle, by the holdfast devices 7. Connected against the rear of the portions 4 are vertically adjustable slotted L-shaped hangers 6. The slots in the hangers 6 are indicated at 6'. Carried by the portions 4 and extending through the slots 6' are detachable holdfast devices 6'' for securing the hangers in adjusted position. Fixedly secured by the holdfast devices 8 upon and transversely of the horizontal arms of the hangers is a support 9 of rectangular cross section and which is of a length to project laterally from the hangers. The width of the support 9 is less than the length of the horizontal arms of the hangers 6 and said support 9 is arranged upon the rear part of said arms. The adjustability of the hangers provide for elevating and lowering the support 9 with respect to the plants.

Secured upon and extending lengthwise of the top of the support 9 is a supply pipe 10 of a length to project from each end of the support. The ends of the pipe 10 are closed and secured to each end thereof, as well as extending forwardly therefrom is an elbow coupling 11 for a purpose to be presently referred to. The pipe 10 is formed of a series of sections connected together by T-couplings 12, 13, 15 and 16 and a four-way coupling 14. The central legs 17 of the couplings 12 and 16 are directed rearwardly. The central legs 18 of the couplings 13 and 15 are directed forwardly. One of the central legs of the coupling 14, indicated at 19, is vertically disposed. Another of the legs of the coupling 14, indicated at 20, is directed rearwardly and is disposed at right angles with respect to the leg 19. The pipe 10 is secured to the support 9 by flanged straps 21, and holdfast devices 22. Each strap is of circular form for the purpose of surrounding the pipe 10. See Figure 7. The holdfast devices 22 extend through the flanges 23 of the straps 21. See Figure 7.

Connected to the legs 17 of the couplings 12 and 16 and to the leg 19 of the coupling 14 are rearwardly directed spraying elements which communicate with the pipe 10 for the reception of the spraying solution therefrom and as each of the spraying elements is of the same construction, but one will be described, as the description of one will apply to the other. Each spraying element comprises a pipe 24 of substantial length having its rear portion formed with a downwardly inclined returned bend 25. Attached to the free end of the returned bend 25 is a nozzle 26 of the adjustable type to control the spray, as for very small plants the size of the spray should be cut down and increased for larger plants. The pipe 24 has its forward end peripherally threaded, as at 27 for connection with a rearwardly directed leg of a coupling. Connected to the vertical leg 19 of the coupling 14 is an upstanding slightly flexible feed pipe 28 for conducting the solution from the tank 2 to the pipe 10. The feed pipe 28 is connected with the tank 2, as at 29, and communicating with the connection 29 is an air conducting pipe 30 which leads from the pump 3.

Connected to each of the elbows 11 and also to each of the legs 18 is a supporting element and as each of said elements is of the same construction, but one will be described, as the description of one will apply to the other. Each of said supporting elements is of circular cross section and is formed from a bar or tube of appropriate length and said bar is bent to provide a rearwardly extending downwardly inclined part 31 which terminates at its forward end in a forwardly directed bend 32 of semi-circular contour. The bend 32 extends upwardly from the part 31 and terminates in a rearwardly directed upper straight part 33 positioned over part 31, peripherally threaded as at 34 for connection to a coupling 11 or a leg 18. The ends of the bar or tube are closed. The supporting elements are alternately disposed with respect to the spraying elements, are arranged below these latter and the rear ends of the supporting elements project beyond and are arranged below the nozzles 26.

Adjustably secured to the part 31 of each of the supporting elements is a series of flexible plant tilting members 35 and each tilting member is of a length to extend from one outer to the other outer supporting element. The tilting members preferably are constructed of rope and are tied or knotted to the supporting elements. The tilting members are arranged a substantial distance below the spraying elements. A tilting member 36 is also secured to the parts 33 of the supporting elements, it is flexible and preferably formed from a length of rope. The tilting member 36 is arranged above the support 9. The several tilting members are secured to the supporting elements at 37, 38, 39 and 40. The tilting members are provided for the purpose of tilting the plants 41 downwardly in a forward direction.

The supporting elements are positioned over the furrows and the major portions of the spraying elements are positioned over the plants, while remaining portion of each spraying element, which is the return bend depends below the tops of the plants.

Owing to the construction and arrangement of the spraying device, in accordance with this invention, as the vehicle moves forwardly the plants will be tilted and the nozzles will provide for the spraying of the solution forwardly towards the underside of the plant, and also upon the plant growth under the leaves and under such conditions the plants are thoroughly sprayed. The nozzles of the spraying elements are arranged a substantial distance below the forward tilting member 36. The tilting members are so disposed that the rear tilting member will be positioned below the nozzle, the tilting member arranged forwardly of the rear tilting member will be positioned above the latter, and the forward tilting member 35 will be positioned above the adjacent rear tilting member. Although the spraying device is shown as set up with three tilting members 35, yet it is to be understood that this number can be increased or diminished if desired. The tilting member 36 is arranged a substantial distance above the forward tilting member 35 and tilts the plant in a manner so that the support 9 can clear the plants without damage thereto.

The tilting members may be loosened or tightened depending on the height of the plant. When employing the device on very small cotton the support 9 will be lowered to the desired extent to provide for satisfactorily spraying the plant. This can also be controlled to a certain extent by loosening or tightening up the tilting members. The spray itself may be raised or lowered by turning the pipe 10 about three quarters of an inch. By turning the pipe 10 rearwardly the entire system of spray pipes would be raised and by turning it forwardly the system lowered.

It is thought the many advantages of a spraying device, in accordance with this invention, can be readily understood, and although the preferred embodiment of the in vention is as illustrated and described, yet it is to be understood that changes in the details of construction can be had which fall within the scope of the invention as claimed.

What I claim is:

1. A spraying device comprising a support adapted to be connected to the rear end of a mobile structure, a series of spaced spraying elements having their rear portions forwardly directed and each provided with a forwardly directed nozzle, a series of supporting members, each having a rearwardly extending downwardly inclined part arranged below a spraying element, plant tilting elements connected to said inclined parts and arranged in spaced relation, a supply pipe secured to said support and communicating with the spraying elements, and means for connecting the forward ends of said supporting elements to said pipe.

2. A spraying device comprising a support adapted to be connected to the rear end of a mobile structure, a series of spraying elements extending rearwardly from said support and having their rear portions forwardly directed, each of said rear portions provided with a forwardly directed nozzle, a series of supporting members arranged forwardly and rearwardly of said support and each having a downwardly extending, inclined part arranged below said spraying elements and an upper part arranged over and spaced from the inclined part, plant tilting elements connected to said inclined parts and arranged in spaced relation, a supply pipe secured to said support and communicating with the spraying elements, means for connecting the upper parts of said supporting elements to said pipe, and a plant tilting member connected to the forwardly directed parts of said supporting elements and arranged forwardly of said pipe.

3. A spraying device comprising a support adapted to be connected to the rear end of a mobile structure, a series of spraying elements extending rearwardly from said support and having their rear portions forwardly directed, each of said rear portions provided with a forwardly directed nozzle, a series of supporting members arranged forwardly and rearwardly of said support and each having a downwardly extending, inclined part arranged below said spraying elements and an upper part arranged over and spaced from the inclined part, plant tilting elements connected to said inclined parts and arranged in spaced relation, a supply pipe secured to said support and communicating with the spraying elements, means for connecting the upper parts of said supporting elements to said pipe, said supporting elements alternately disposed with respect to said spraying elements, and a plant tilting member secured to the forwardly directed parts of the supporting elements and arranged forwardly of said supply pipe.

In testimony whereof, I affix my signature hereto.

ALBERT his × mark JAECKS.